(12) United States Patent
Osawa

(10) Patent No.: US 10,271,029 B2
(45) Date of Patent: Apr. 23, 2019

(54) IMAGE PICKUP APPARATUS AND METHOD OF CONTROLLING AN IMAGE PICKUP APPARATUS

(71) Applicant: CANON KABUSHIKI KAISHA, Tokyo (JP)

(72) Inventor: Shinnosuke Osawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/834,509

(22) Filed: Dec. 7, 2017

(65) Prior Publication Data

US 2018/0167594 A1 Jun. 14, 2018

(30) Foreign Application Priority Data

Dec. 14, 2016 (JP) .................................. 2016-242163

(51) Int. Cl.
*G06T 5/00* (2006.01)
*H04N 9/64* (2006.01)
*H04N 5/232* (2006.01)
*H04N 5/235* (2006.01)

(52) U.S. Cl.
CPC ............... *H04N 9/643* (2013.01); *G06T 5/00* (2013.01); *G06T 5/009* (2013.01); *H04N 5/235* (2013.01); *H04N 5/2351* (2013.01); *H04N 5/2352* (2013.01); *H04N 5/23219* (2013.01); *G06T 2207/10024* (2013.01); *G06T 2207/20208* (2013.01); *G06T 2207/30201* (2013.01)

(58) Field of Classification Search
CPC . G06T 2207/10024; G06T 2207/20208; G06T 2207/30201; G06T 5/00; G06T 5/009; H04N 5/235; H04N 5/2351; H04N 5/2352; H04N 9/643
See application file for complete search history.

(56) References Cited

U.S. PATENT DOCUMENTS

| 2002/0122121 | A1* | 9/2002 | Fujii | H04N 5/23212 348/240.2 |
| 2003/0076437 | A1* | 4/2003 | Karasaki | H04N 5/23212 348/347 |
| 2007/0052838 | A1* | 3/2007 | Zhang | H04N 5/235 348/362 |

(Continued)

FOREIGN PATENT DOCUMENTS

JP 2010-183461 A 8/2010
JP 4803178 B2 10/2011

*Primary Examiner* — Amy R Hsu
(74) *Attorney, Agent, or Firm* — Cowan, Liebowitz & Latman, P.C.

(57) ABSTRACT

An image pickup apparatus, which is configured to perform tone correction for preventing saturation of a pixel signal value of a photographed image, the image pickup apparatus including: a first correction unit configured to perform first tone correction that combines exposure control and gain control on the pixel signal value of the image; a second correction unit configured to perform second tone correction for reducing a pixel signal value in a region in which the pixel signal value of the image is higher than a predetermined value; and a determination unit configured to determine a first correction amount to be used for the first tone correction and a second correction amount to be used for the second tone correction in accordance with a photographing condition.

16 Claims, 6 Drawing Sheets

(56) References Cited

U.S. PATENT DOCUMENTS

| | | | |
|---|---|---|---|
| 2008/0212892 A1* | 9/2008 | Doida | G06T 5/009 382/274 |
| 2009/0040364 A1* | 2/2009 | Rubner | G06T 3/4053 348/362 |
| 2012/0249844 A1* | 10/2012 | Saito | H04N 5/2355 348/242 |
| 2017/0094241 A1* | 3/2017 | Fujiwara | H04N 1/46 |

* cited by examiner

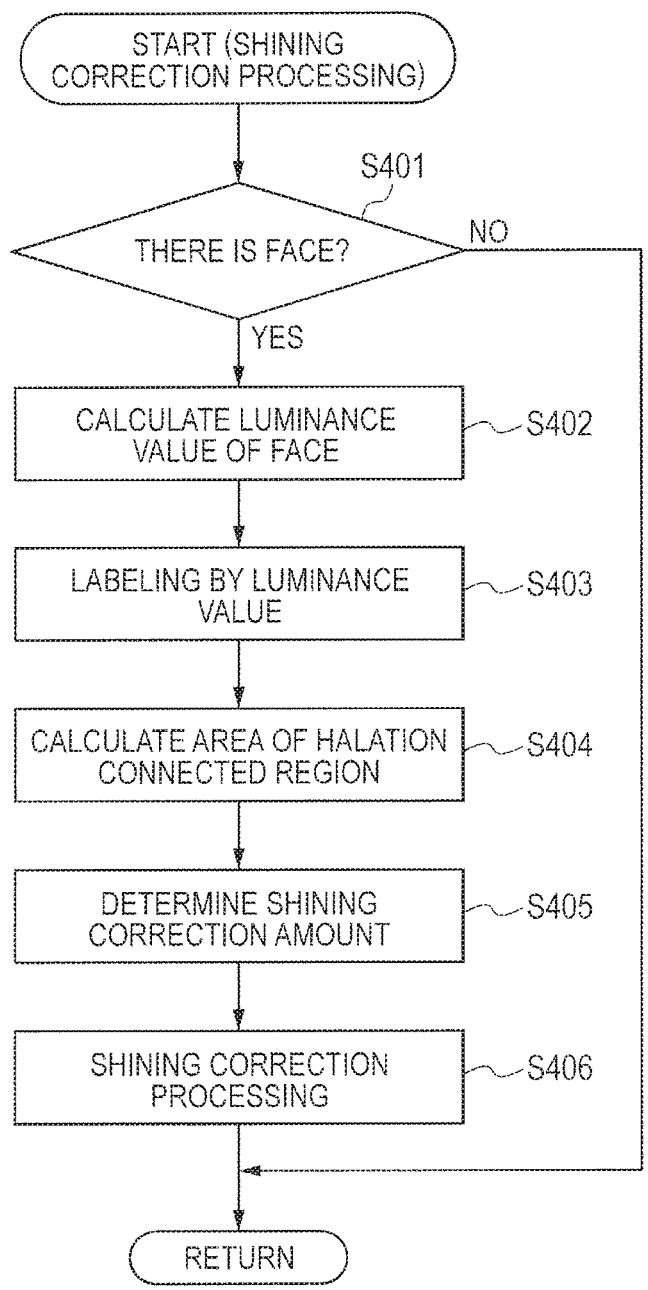

FIG. 5A
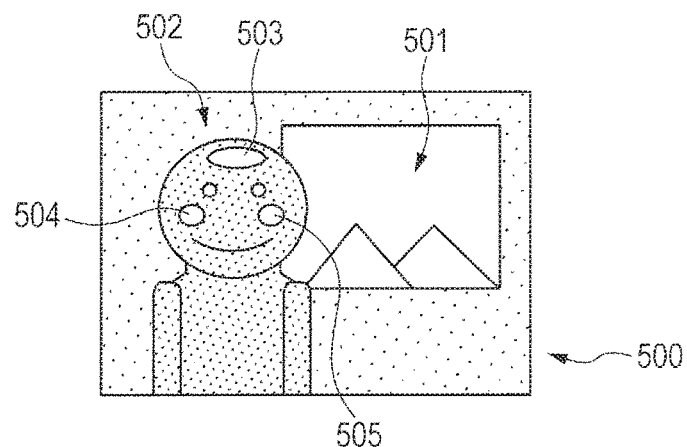
FIG. 5B
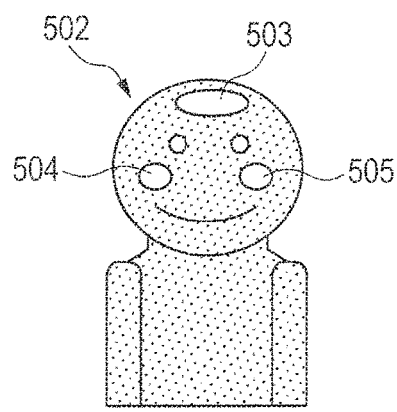
FIG. 6
| ISO SENSITIVITY | ~100 | ~400 | ~1600 | ~6400 | 6400~ |
|---|---|---|---|---|---|
| D+ CORRECTION AMOUNT (APEX VALUE) | 2.0 | 1.0 | 0.8 | 0.5 | 0.0 |

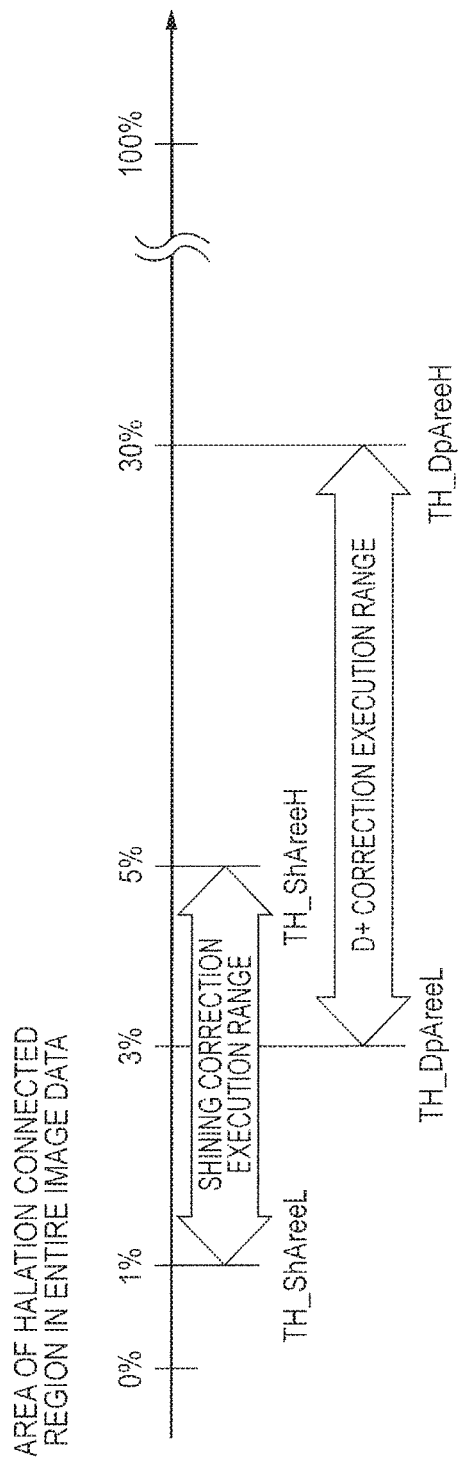

IMAGE PICKUP APPARATUS AND METHOD OF CONTROLLING AN IMAGE PICKUP APPARATUS

BACKGROUND OF THE INVENTION

Field of the Invention

This disclosure relates to an image pickup apparatus and a method of controlling an image pickup apparatus.

Description of the Related Art

Hitherto, there has been known a technology for performing image tone correction so as to obtain an image with suitable brightness and contrast. In particular, in an image photographed in a backlight scene in which a main object is significantly darker than the background, saturation of a pixel signal value, which is so-called "halation", tends to occur, and as a technology for correcting the halation, there is known a technology as disclosed in, for example, Japanese Patent Application Laid-Open No. 2010-183461. In the technology described in Japanese Patent Application Laid-Open No. 2010-183461, first, at the stage of exposing an image pickup element, an image is picked up by darker exposure than appropriate exposure so that the halation is prevented from occurring. Then, output luminance conversion is performed so that a luminance value of a region photographed by the darker exposure than the appropriate exposure is raised to an appropriate level to make the region brighter. The processing of the exposure control and the level correction as thus described is hereinafter referred to as dynamic range expansion correction (D-range expansion correction). Further, as disclosed in Japanese Patent No. 4803178, there is also known such a correction technology as to detect a halation region generated in an image obtained by photographing and lower a signal value of the halation region. Such correction processing is hereinafter referred to as shining correction.

However, when the D-range expansion correction processing is performed to make brighter the image photographed by the darker exposure as in Japanese Patent Application Laid-Open No. 2010-183461, a noise component of the image may also be amplified to cause a decrease in S/N ratio. Further, in the case of performing the shining correction processing to lower the signal value of the halation region as in the Japanese Patent No. 4803178, with information on the tone of the halation region already lost, the corrected region may become an unnatural image that appears like a so-called solid image when the halation region is large to some extent.

SUMMARY OF THE INVENTION

According to an aspect of an embodiment, there is provided an image pickup apparatus, which is configured to perform tone correction for preventing saturation of a pixel signal value of a photographed image, the image pickup apparatus including: a first correction unit configured to perform first tone correction that combines exposure control and gain control on the pixel signal value of the image; a second correction unit configured to perform second tone correction for reducing a pixel signal value in a region in which the pixel signal value of the image is higher than a predetermined value; and a determination unit configured to determine a first correction amount to be used for the first tone correction and a second correction amount to be used for the second tone correction in accordance with a photographing condition.

According to another aspect of an embodiment, there is provided an image pickup apparatus, which is configured to perform tone correction for preventing saturation of a pixel signal value of a photographed image, the image pickup apparatus including: a first correction unit configured to perform first tone correction that combines exposure control and gain control on the pixel signal value of the image; a second correction unit configured to perform second tone correction for reducing a pixel signal value in a region in which the pixel signal value of the image is higher than a predetermined value; an analysis unit configured to analyze a photographing scene; and a determination unit configured to determine a first correction amount to be used for the first tone correction and a second correction amount to be used for the second tone correction based on a result of the analysis.

According to further another aspect of an embodiment, there is provided a method of controlling an image pickup apparatus configured to perform tone correction for preventing saturation of a pixel signal value of a photographed image, the method including: determining a first correction amount to be used for first tone correction and a second correction amount to be used for second tone correction in accordance with a photographing condition; performing the first tone correction that combines exposure control and gain control on the pixel signal value of the image, through use of the first correction amount; and performing the second tone correction for reducing a pixel signal value in a region in which the pixel signal value of the image is higher than a predetermined value, through use of the second correction amount.

According to further another aspect of an embodiment, there is provided a method of controlling an image pickup apparatus configured to perform tone correction for preventing saturation of a pixel signal value of a photographed image, the method including: analyzing a photographing scene; determining a first correction amount to be used for first tone correction and a second correction amount to be used for second tone correction based on a result of the analysis; performing the first tone correction that combines exposure control and gain control on the pixel signal value of the image, through use of the first correction amount; and performing the second tone correction for reducing a pixel signal value in a region in which the pixel signal value of the image is higher than a predetermined value, through use of the second correction amount.

Further features of the present invention will become apparent from the following description of exemplary embodiments with reference to the attached drawings.

BRIEF DESCRIPTION OF THE DRAWINGS

FIG. 4 is a flowchart for illustrating a flow of shining correction processing.

FIG. 5A and FIG. 5B are views for illustrating an example of an image photographed in a backlight scene.

FIG. 6 is a table for showing an example of an upper limit of a D-range expansion correction amount in accordance with a photographing condition.

FIG. 7 is a diagram for illustrating an example of setting a threshold area used for correction amount calculation.

DESCRIPTION OF THE EMBODIMENTS

Preferred embodiments of the present invention will now be described in detail in accordance with the accompanying drawings. An image pickup apparatus according to an embodiment of this disclosure is applicable to a digital camera, a digital video camera, various mobile terminals such as a smartphone and a tablet having camera functions, an industrial camera, an in-vehicle camera, a medical camera, and the like. In this embodiment, a description is given by citing a digital camera as an example.

<Configuration of Digital Camera>

Figure 1:
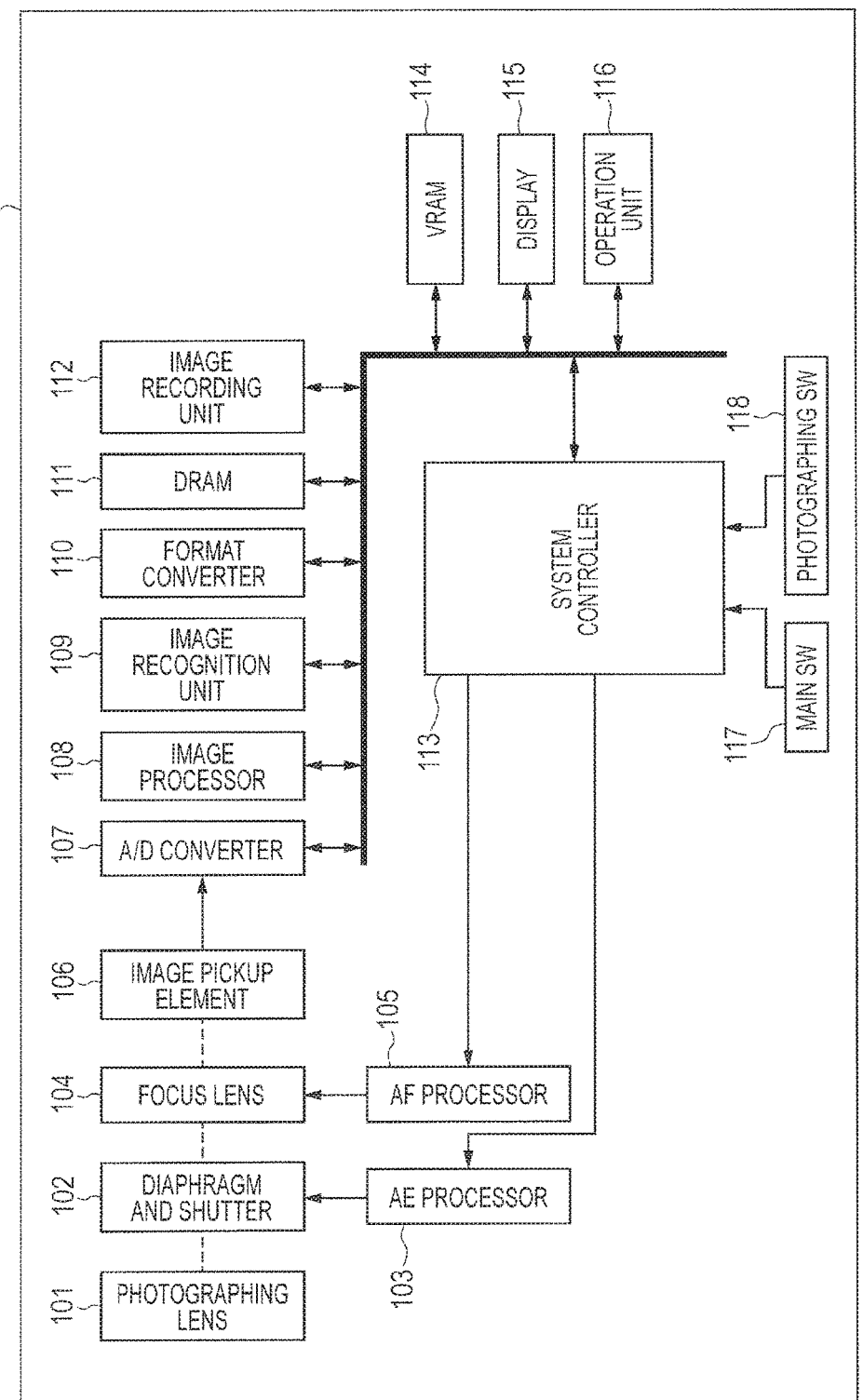
FIG. 1 is a block diagram for illustrating a configuration example of a digital camera.

FIG. 1 is a block diagram for illustrating a schematic configuration of a digital camera 100 of this embodiment. As an image pickup mechanism, the digital camera 100 includes a photographing lens 101, a diaphragm and shutter 102, an automatic exposure (AE) processor 103, a focus lens 104, an autofocus (AF) processor 105, an image pickup element 106, and an A/D converter 107. The digital camera 100 also includes an image processor 108, an image recognition unit 109, a format converter 110, and a DRAM 111. The digital camera 100 further includes an image recording unit 112, a system controller 113, a VRAM 114, a display 115, an operation unit 116, a main switch (main SW) 117, and a photographing switch (photographing SW) 118.

The photographing lens 101 includes a zoom mechanism. The diaphragm and shutter 102 adjusts an amount of incident light on the image pickup element 106 and a time length of incidence of light on the image pickup element 106 in accordance with an instruction from the AE processor 103, to thereby achieve exposure control. The AE processor 103 controls an operation of the diaphragm and shutter 102. The focus lens 104 is focused on the light receiving surface of the image pickup element 106 in accordance with a control signal from the AF processor 105 to form an optical image thereon. The AF processor 105 can also calculate distance information from the digital camera 100 to an object.

The image pickup element 106 includes a photoelectric conversion element such as a CCD element or a CMOS element, converts the optical image formed on the light receiving surface of the photoelectric conversion element to an electric signal, and outputs the electric signal to the A/D converter 107. The A/D converter 107 converts the electric signal (analog signal) input from the image pickup element 106 to a digital signal. The A/D converter 107 also includes a CDS circuit for removing noise from the electric signal input from the image pickup element 106 and a nonlinear amplification circuit for amplifying the analog signal in a nonlinear form before converting the analog signal to the digital signal.

The image processor 108 performs so-called development processing for performing predetermined resizing processing, which includes pixel interpolation and image size reduction, and predetermined color conversion processing on the digital signal input from the A/D converter 107 to output image data.

The image processor 108 also has such a function as to perform tone correction on the input digital signal by, for example, processing for increasing or decreasing the signal level, to thereby adjust the quality of the photographed image. For example, as a tone correction function of adjusting the signal level of the image, the image processor 108 has a function of increasing or decreasing the signal level with a uniform amplification factor throughout the image, a so-called tone curve (gamma) function of converting the signal level in accordance with the magnitude of the original signal level, and some other function. Through use of this tone correction function, the digital camera 100 of this embodiment can achieve processing in accordance with level correction (gain correction) within dynamic range expansion correction processing (D-range expansion correction processing) described later. The image processor 108 also has a tone correction function of performing processing such as addition, subtraction, multiplication, and replacement on a color luminance signal value as to a predetermined region in the image. Through use of such a tone correction function for the predetermined region in the image, the digital camera 100 of this embodiment can achieve shining correction processing described later.

The image recognition unit 109 receives input of image data appropriately processed by the image processor 108. The image recognition unit 109 has a function of recognizing a brightness status and an in-focus status of the input image. Information indicating the brightness status of the image recognized by the image recognition unit 109 is transmitted to the AE processor 103, and information indicating the in-focus status is transmitted to the AF processor 105. This leads the AE processor 103 to achieve exposure control based on the information indicating the brightness status, and leads the AF processor 105 to achieve AF control based on the information indicating the in-focus status. The image recognition unit 109 also has a function of recognizing, for example, a face of a person and an expression of the face in the input image. Further, the pieces of information indicating the brightness status, the in-focus status, and the recognition results of the face and the like, which are obtained by the image recognition unit 109, are transmitted also to the system controller 113 to be used in performing photographing scene analysis processing described later or tone correction processing such as the shining correction processing or the D-range correction processing described later.

The format converter 110 performs format conversion on the image data processed by the image processor 108 in order to store the image data into the DRAM 111.

The DRAM 111 is an example of a built-in memory capable of performing high-speed writing/reading processing, and is used as a high-speed buffer for temporarily storing the image data or as a working memory for compression/expansion processing of the image data.

The image recording unit 112 includes a record medium, for example, a memory card for recording a photographed image (still image, moving image, or the like) and its interface.

The VRAM 114 is a memory for image display.

The display 115 is, for example, a liquid crystal display (LCD), and not only can display an image, perform display for assisting the operation, display the state of the camera, for example, an operation mode of the camera, and perform some other display, but also can display even a photographing screen and a distance measurement region during photographing. The display 115 includes a monitor and an electronic view finder (EVF) provided on, for example, the back surface of a casing of the digital camera 100.

The main switch 117 is a switch to be operated when the user turns on or off power of the digital camera 100. When receiving the user's input of an instruction to turn on the power via the main switch 117, the digital camera 100 supplies power to each unit.

The photographing switch 118 is a release button, and can detect a two-stage operation in accordance with the depth of depression of the button. An operation signal of the photographing switch 118 is transmitted to the system controller 113. When the button of the photographing switch 118 is lightly depressed, the system controller 113 causes the AE processor 103 to perform the AE processing and causes the AF processor 105 to perform the AF processing as a photographing preparation operation. A state in which the operation has been performed to lightly depress the button of the photographing switch 118 is hereinafter referred to as "SW1 depression". When the button of the photographing switch 118 is depressed more deeply than in the case of the SW1 depression, the system controller 113 controls each unit to execute final photographing. A state in which the operation has been performed to depress the button of the photographing switch 118 more deeply than in the case of the SW1 depression is hereinafter referred to as "SW2 depression".

Now, a series of processing from power-on of the digital camera 100 to photographing by the digital camera 100 of this embodiment is briefly described. First, when the power is turned on by a power-on operation performed on the main switch 117, the digital camera 100 is brought to a photographing standby state for causing the image pickup element 106 to pick up an image periodically, for example, with a period of 33 ms, and causing the display 115 to sequentially display photographed images obtained by the periodical image pickup. When a photographing instruction is then made by the SW2 depression after the SW1 depression on the photographing switch 118, the digital camera 100 causes the image pickup element 106 to perform final photographing processing. The digital camera 100 then causes the image processor 108 to perform image processing on the photographed image data obtained by the final photographing processing, and causes the image recording unit 112 to record the image data obtained after the image processing. After that, the digital camera 100 returns to the final photographing standby state. When the power-off operation is performed on the main switch 117, the digital camera 100 stops supplying power to each unit.

The operation unit 116 includes: buttons, switches, a touch panel, and the like to be operated by the user; and an interface circuit for generating a signal in accordance with an operation of each of the buttons, the switches, the touch panel, and the like. Specifically, the operation unit 116 includes: menu switches for making various settings such as settings of an exposure correction value and a diaphragm value for the image photographing time and a setting for image reproduction time; a zoom lever for instructing a zoom operation of the photographing lens; and a selection switch of an operation mode.

The operation mode selection switch is a switch to be operated when the user selectively switches between a photographing mode and a reproduction mode. The photographing mode includes various photographing modes such as a full automatic mode, a scenery mode, a portrait mode, a macro mode, and a sport mode, and the user is allowed to select a desired photographing mode out of those modes through the operation of the operation mode selection switch. When the desired photographing mode is selected out of those various photographing modes, the system controller 113 sets photographing conditions in accordance with the selected photographing mode. Further, in the full automatic mode, the system controller 113 analyzes a photographing scene based on a result of image recognition performed by the image recognition unit 109, for example, to make automatic settings for photographing conditions suitable for backlight photographing, night view photographing, scenery photographing, portrait photographing, macro photographing, sport photographing, and some other photographing.

The system controller 113 includes a CPU, a ROM, and a RAM (not shown). The CPU of the system controller 113 loads a program stored in the ROM onto a work area of the RAM and executes the program, to thereby perform overall operation control on the digital camera. The system controller 113 also performs control as to which mode is to be used among a plurality of image pickup driving modes of the image pickup element 106 and makes a setting for a photographing condition in accordance with the various photographing modes described above.

As an example of setting a photographing condition in accordance with the photographing mode, for example, when the backlight photographing is performed, the system controller 113 sets a photographing condition, for example, an ISO sensitivity, which is suitable for a backlight scene in such a case of photographing a person standing with his or her back against a light source. Further, for example, when the sport photographing is performed, the system controller 113 sets a photographing condition, for example a shutter speed, which is suitable for a sport scene in such a case of photographing a person or the like moving fast. Moreover, for example, when the portrait photographing or the macro photographing is performed, the system controller 113 sets a photographing condition, for example, a diaphragm value, which is suitable for a portrait scene or a macro scene in such a case of focusing on the main object while causing much blurring in the background or the like. According to this embodiment, those photographing conditions are also used in determining a correction value for the D-range expansion correction processing and a correction value for the shining correction processing, which are described later.

When the system controller 113 analyzes a photographing scene based on the result of image recognition performed by the image recognition unit 109, for example, as described later, the system controller 113 performs such processing as to obtain one of a position and an area of a region with a pixel signal value saturated in the image. Then, the one of the position and the area of the region with the pixel signal value saturated is used in determining a correction value for the D-range expansion correction processing and a correction value for the shining correction processing, which are described later.

Next, tone correction processing of this embodiment is described, the processing being executed in the digital camera 100 having the configuration illustrated in FIG. 1 described above. The digital camera 100 of this embodiment can carry out any one of two types of processing, which are first tone correction processing and second tone correction processing described below, or tone correction that combines both those types of processing.

<First Tone Correction Processing>

The first tone correction processing is such tone correction processing as to perform, when a scene of mixture of a low luminance object and a high luminance object is photographed, the exposure control and the tone curve setting control, to thereby prevent saturation on the high luminance side, so-called halation. In this embodiment, such tone correction is referred to as dynamic range expansion correction (D-range expansion correction or D+ correction). Examples of the scene of mixture of a low luminance object and a high luminance object include a backlight scene. In the following, the first tone correction processing (D-range expansion correction processing) is described specifically.

Typically, before final photographing, a diaphragm value, a shutter speed, an ISO sensitivity, and the like are determined as photographing conditions. At this time, the digital camera 100 determines exposure in accordance with luminance information on a photographed image, the presence or absence of a face of a person in the image, or the like, in the final photographing standby state. However, there is a limit on the dynamic range of the image pickup element, and for example, in the backlight scene in such a case of photographing a person standing with his or her back against a light source, it may happen that the person is excessively dark or the background is excessively bright, whatever settings are made for the diaphragm, the shutter speed, and the gain. In this embodiment, the D-range expansion correction processing is performed as processing for reducing the phenomenon that the background is excessively bright as described above.

FIG. 5A is a view for illustrating an example of an image 500 obtained when photographing is performed in such a typical backlight scene as to involve photographing of a person standing by a window. In the case of the image 500 in the backlight scene as in FIG. 5A, a region 501 of a scenery outside the window is excessively bright compared to a region 502 of the person, and hence, for example, when exposure is focused on the person, the halation occurs in the region 501 outside the window (i.e., high luminance portion). Therefore, in the D-range expansion correction processing, the final photographing is performed with the exposure set on an underexposed level so as to prevent the occurrence of the halation in the high luminance portion, and gamma processing is performed through use of the tone curve (gamma) that is set so as to raise the luminance of the low luminance portion of the obtained photographed image data. FIG. 5B and regions 503 to 505 of FIG. 5A are described later.

<Second Tone Correction Processing>

The second tone correction processing is shining correction processing for selectively performing tone correction for reducing a pixel signal value on a saturated region (halation region) in the image obtained after the final photographing. In the following, the second tone correction processing (shining correction processing) is described specifically.

Due to the limit on the dynamic range of the image pickup element as mentioned in the description of the first tone correction processing, the halation may partially occur in an object region and the like in the finally photographed image. For example, in a face of a person having directly received the sunlight or illuminating light, strong reflection of light, so-called shining, may occur on his or her cheek, forehead, and the like, and the halation may occur in those portions. It is the shining correction processing that reduces such a shining phenomenon.

For example, the image 500 of FIG. 5A is an illustration of a state in which the shining has occurred due to illuminating light or the like in cheek regions 504 and 505 and a forehead region 503 in the region 502 of the person. In the shining correction processing, a correction target region, for example, the face is first selected from the photographed image, and from luminance values of the correction target region, a region (halation region) having a luminance value that may cause the halation is obtained. Subsequently, in the shining correction processing, a color component ratio of the halation region is estimated based on color component ratios of peripheral pixels around the obtained region, and a pixel signal value of the halation region is subjected to subtraction so as to be brought closer to the estimated color component ratio. Through such processing, the luminance of the region that has caused the halation falls to recover the tone of the color and reduce the shining.

<Flow of Tone Correction Processing>

Next, an entire flow for obtaining an image with a more appropriate tone by using the first and second tone correction processing described above in the digital camera 100 of this embodiment is described with reference to flowcharts of FIG. 2 to FIG. 4.

Figure 2:
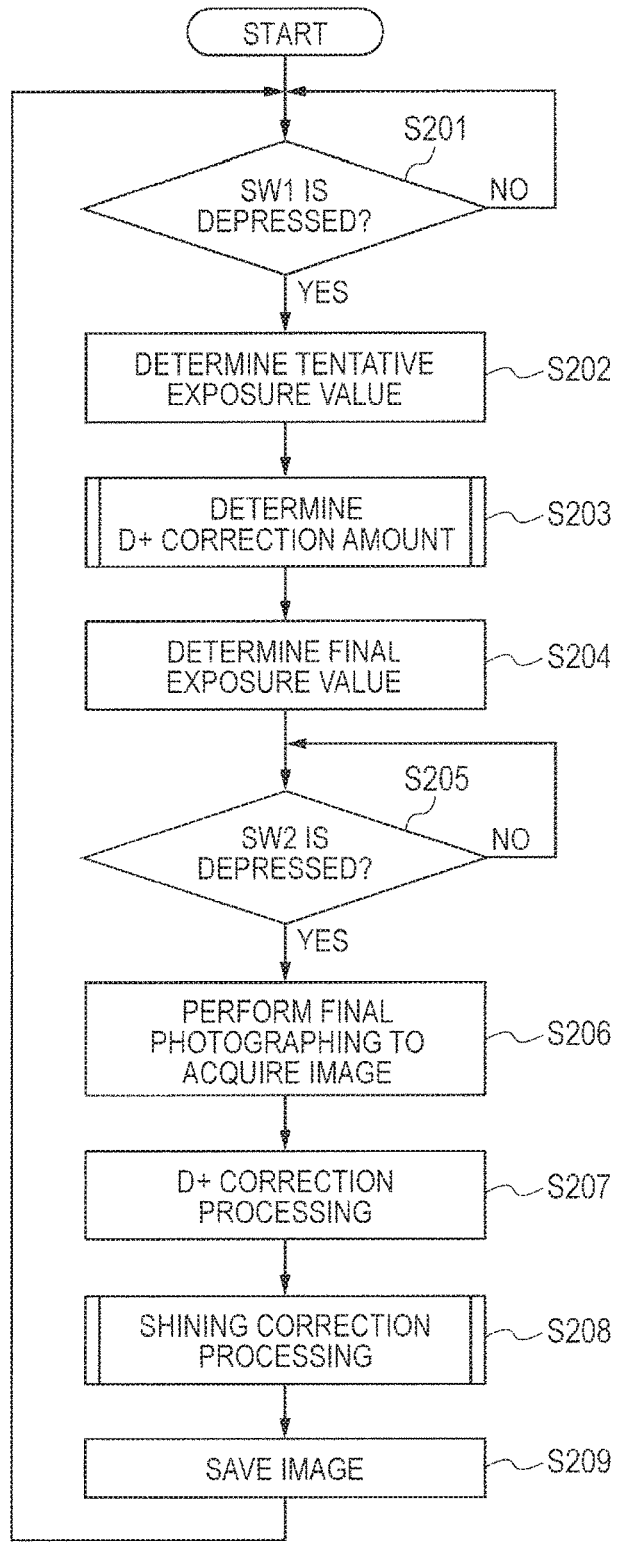
FIG. 2 is a flowchart for illustrating a flow of tone correction.
Figure 3:
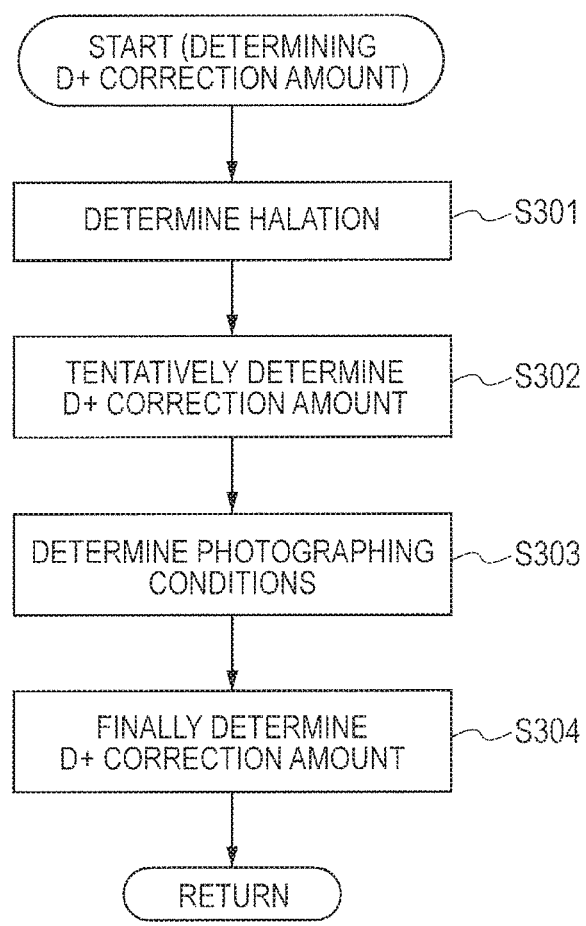
FIG. 3 is a flowchart for illustrating a flow of D-range expansion correction amount determination processing.

FIG. 2 is a flowchart for illustrating a flow of the entire processing from photographing to recording (saving) of the image in the digital camera 100. The processing of each step illustrated in the flowchart of FIG. 2 is achieved by, for example, the system controller 113 controlling each unit of the digital camera 100 based on a program.

The processing of the flowchart of FIG. 2 is started by the user's input of a power-on instruction into the main switch 117, application of power to each unit to activate the digital camera 100, and initialization and activation of various devices. The digital camera 100 at this time performs a photographing preparation operation, for example, EVF image display on the display 115, and is brought to the photographing standby state described before.

When the processing of the flowchart of FIG. 2 is started, the system controller 113 determines whether or not the SW1 depression has been performed on the photographing switch 118 by the user in Step S201. The system controller 113 continues the determination of Step S201 while the SW1 depression is not performed (No), and advances the processing to Step S202 when determining that the SW1 depression has been performed (Yes).

When advancing the processing to Step S202, the system controller 113 determines a tentative exposure value via the AE processor 103 based on a result of the image recognition processing (a result of brightness status recognition) performed by the image recognition unit 109. The tentative exposure value at this time is determined as an exposure value without consideration of the D-range expansion correction processing. At this point, the image recognition unit 109 first divides the photographed image obtained by the image pickup element 106 into a plurality of blocks with fineness to the degree of 24 pixels in the vertical direction and 16 pixels in the lateral direction, and obtains a luminance value of each block. Next, the image recognition unit 109 calculates an average value obtained by adding a weight set for the position of each block (weighted average value) with respect to the luminance value of each block. The AE processor 103 then obtains such an exposure value as to have the weighted average value closer to a predetermined value, and determines the exposure value as a tentative exposure value. Through such processing, an exposure value is determined, which is appropriate for the object with brightness close to an average luminance of the entire screen. However, for example, when the backlight scene described above or other such scene in which the object is dark and the background and the like are bright is photographed, the tentative exposure value determined as described above becomes an exposure value too high for the high luminance region, which may cause the occurrence of the halation. After Step S202, the system controller 113 advances the processing to Step S203.

When advancing the processing to Step S203, the system controller 113 determines a correction amount for the D-range expansion correction processing. A specific content of the processing in determining the D-range expansion correction amount is described later in the flowchart of FIG. 3. After Step S203, the system controller 113 advances the processing to Step S204.

When advancing the processing to Step S204, the system controller 113 determines a final exposure value via the AE processor 103. The final exposure value is determined as an exposure value decreased from the tentative exposure value determined in Step S202 by an amount corresponding to the D-range expansion correction amount determined in Step S203. After Step S204, the system controller 113 advances the processing to Step S205.

When advancing the processing to Step S205, the system controller 113 determines whether or not the SW2 depression has been performed on the photographing switch 118 by the user. The system controller 113 continues the determination of Step S205 while the SW2 depression is not performed (No), and advances the processing to Step S206 when determining that the SW2 depression has been performed (Yes).

When advancing the processing to Step S206, the system controller 113 controls each unit so as to perform final photographing based on the final exposure value determined in Step S204. With this, an image obtained by the final photographing is acquired from the image pickup element 106 via the A/D converter 107. For example, when the backlight scene described above is photographed, a finally photographed image with an underexposed object is acquired. After Step S206, the system controller 113 advances the processing to Step S207.

When advancing the processing to Step S207, the system controller 113 causes the image processor 108 to perform gain correction based on the D-range expansion correction processing. Specifically, for example, when the backlight scene described above is photographed, in the image processor 108, the gamma processing using such a tone curve as to raise the luminance of the underexposed low luminance region is performed as mentioned in the description of the first tone correction processing. After Step S207, the system controller 113 advances the processing to Step S208.

When advancing the processing to Step S208, the system controller 113 performs the shining correction processing via the image processor 108. A specific content of the shining correction processing is described later in the flowchart of FIG. 4. After Step S208, the system controller 113 advances the processing to Step S209.

When advancing the processing to Step S209, the system controller 113 causes the image recording unit 112 to record image data obtained by the final photographing eventually from the processing of Steps S201 to S208. After Step S209, the system controller 113 returns the processing to Step S201 and proceeds to the processing for the next photographing.

<Flow of D-Range Expansion Correction Amount Determination Processing>

In the following, a flow of D-range expansion correction amount determination processing performed in Step S203 of FIG. 2 is described. FIG. 3 is a flowchart for illustrating the flow of the D-range expansion correction amount determination processing performed under control of the system controller 113. When advancing the processing to Step S203 of FIG. 2, the system controller 113 starts the processing of the flowchart illustrated in FIG. 3.

When advancing the processing to Step S301, the system controller 113 performs determination processing as to whether or not the halation is to occur based on a result of the image recognition processing (a result of brightness status recognition) performed by the image recognition unit 109. The image recognition unit 109 at this time performs processing for dividing each image, periodically photographed through use of the tentative exposure value determined in Step S202 of FIG. 2 in the final photographing standby state, into a plurality of blocks with fineness to the degree of 24 pixels in the vertical direction and 16 pixels in the lateral direction. The image recognition unit 109 further obtains a distribution of a luminance value of each pixel in each block (a cumulative frequency of each luminance value). The image recognition unit 109 then determines, as a halation block, a block in which a luminance value with its cumulative frequency higher than a predetermined value is a luminance value not smaller than a previously set threshold in the distribution of the luminance value obtained in each block. After Step S301, the system controller 113 advances the processing to Step S302.

When advancing the processing to Step S302, the system controller 113 determines a D-range correction amount (D+ correction amount). Specifically, the system controller 113 first obtains an area HL_Area1 obtained by totaling up areas of the respective blocks determined as the halation blocks in Step S301, and then compares the total area HL_Area1 with a previously set threshold area. In this embodiment, as the threshold area to be used in determining the D-range correction amount, a lower limit area TH_DpAreaL and an upper limit area TH_DpAreaH are previously set. The lower limit area TH_DpAreaL is set as a smaller area than the upper limit area TH_DpAreaH. In this embodiment, the lower limit area TH_DpAreaL and the upper limit area TH_DpAreaH are used to be compared with the total area HL_Area1 as in Expression (1).

$$TH\_DpAreaL < HL\_Area1 < TH\_DpAreaH \qquad \text{Expression (1)}$$

When Expression (1) is satisfied, the system controller 113 tentatively determines the D-range expansion correction amount based on an average luminance value of each block determined as the halation block in Step S301. As specific processing for obtaining the D-range expansion correction amount based on the average luminance value of each block, a known technology described in Japanese Patent Application Laid-Open No. 2010-183461 and the like can be used, and the detailed description thereof is omitted here.

Further, in the case of this embodiment, for example, when the total area HL_Area1 is not smaller than the upper limit area TH_DpAreaH, the system controller 113 sets the D-range expansion correction amount to zero (0). Similarly, also when the total area HL_Area1 is not larger than the lower limit area TH_DpAreaL, the system controller 113 sets the D-range expansion correction amount to zero (0). The D-range expansion correction amount being zero (0) means, in other words, that the D-range expansion correction processing is not performed. Specific examples of the lower limit area TH_DpAreaL and the upper limit area TH_DpAreaH are described later in FIG. 7. After Step S302, the system controller 113 advances the processing to Step S303.

When advancing the processing to Step S303, the system controller 113 determines the photographing conditions. Specifically, the system controller 113 determines the respective values of the ISO sensitivity, the shutter speed, and the diaphragm based on the tentative exposure value determined in Step S202 of FIG. 2. After Step S303, the system controller 113 advances the processing to Step S304.

When advancing the processing to Step S304, the system controller 113 finally determines the D-range expansion correction amount based on the photographing conditions determined in Step S303. Specifically, when the D-range expansion correction amount tentatively determined in Step S302 exceeds the upper limit of the D-range expansion correction provided in each photographing condition shown in FIG. 6, the system controller 113 determines a correction amount lowered to the upper limit as the finally determined D-range expansion correction amount. After Step S304, the system controller 113 advances the processing to Step S204 of FIG. 2.

The example of FIG. 6 is a table for showing the relationship between the ISO sensitivity as the photographing condition and the D-range expansion correction amount (D+ correction) in additive system of photographic exposure (APEX) notation. As an example, in the case of the ISO sensitivity being "up to 100", when "2.0" of the D+ correction amount (APEX value) corresponds to the upper limit and the D-range expansion correction amount tentatively determined in Step S302 is larger than "2.0", a value lowered to "2.0" is finally determined as the D-range expansion correction amount. Hence, in the case of this example, in the final exposure determination processing of S204 of FIG. 2, after the ISO sensitivity is set to "up to 100", at least one of the shutter speed and the diaphragm value is adjusted to determine a correction amount corresponding to "2.0" in APEX notation. Further in Step S207 of FIG. 2, the correction processing is performed by the gain control using a tone curve previously determined in accordance with "2.0" of the D+ expansion correction amount (APEX value).

<Flow of Shining Correction Processing>

Subsequently, the shining correction processing performed in Step S208 of FIG. 2 is described. FIG. 4 is a flowchart for illustrating a flow of the shining correction processing performed under control of the system controller 113. When advancing the processing to Step S208 of FIG. 2, the system controller 113 starts the processing of the flowchart illustrated in FIG. 4.

When advancing the processing to Step S401, the system controller 113 determines the presence or absence of a partial region corresponding to a face of a person (hereinafter referred to as face region) in the finally photographed image based on a result of face recognition of the finally photographed image by the image recognition unit 109. When determining in Step S401 that there is no face region (No), the system controller 113 completes the shining correction processing of FIG. 4, and advances the processing to Step S209 of FIG. 2. On the other hand, when determining in Step S401 that there is a face region (Yes), the system controller 113 advances the processing to Step S402.

When advancing the processing to Step S402, the system controller 113 controls the image recognition unit 109 to calculate a luminance value of the face region. The image recognition unit 109 at this time calculates a luminance value of each pixel contained in the face region in the finally photographed image. After Step S402, the system controller 113 advances the processing to Step S403.

When advancing the processing to Step S403, the system controller 113 performs labeling processing through use of the luminance value of the face region. Specifically, the system controller 113 determines a pixel with its luminance value exceeding a predetermined value as to each pixel of the face region calculated in Step S402, and sets the determined pixel as a halation pixel. Further, the system controller 113 determines whether or not each of pixels adjacent vertically or horizontally to the halation pixel is also a halation pixel. The system controller 113 then determines, as a halation pixel connected region, a region in which those pixels determined as the halation pixels are present together in a group, and performs labeling on the region. After Step S403, the system controller 113 advances the processing to Step S404.

When advancing the processing to Step S404, the system controller 113 calculates the respective areas of a plurality of halation connected regions each labeled in Step S403. That is, according to the processing of Step S403 and the processing of Step S404, for example, a total area of the halation pixels dispersed in the entire screen in the positional relationship is not calculated, but an area of each connected region is calculated, the connected region being made up of the halation pixels continuously present to form a group in the positional relationship. The system controller 113 then selects a region with the largest area of the respective halation connected regions with the areas thereof obtained. The area of the largest region is referred to as HL_Area2. For example, in the case of the image 500 of FIG. 5A described above, in the region 502 of the person, the cheek regions 504 and 505 and the forehead region 503 have been obtained as the respectively labeled halation connected regions (i.e., shining regions). FIG. 5B is a view for illustrating the region 502 of the person extracted from the image 500 of FIG. 5A. In FIG. 5B, of the three regions which are the cheek regions 504 and 505 and the forehead region 503 being the halation connected regions (shining regions), the region with the largest area is the forehead region 503. After Step S404, the system controller 113 advances the processing to Step S405.

When advancing the processing to Step S405, the system controller 113 determines a shining correction amount. Specifically, the system controller 113 first compares the largest region area HL_Area2 obtained in Step S404 with a previously set threshold area. In this embodiment, as the threshold area to be used in determining the shining correction amount, a lower limit area TH_ShAreaL and an upper limit area TH_ShAreaH are previously set. The lower limit area TH_ShAreaL is made to be a smaller area than the upper limit area TH_ShAreaH. In this embodiment, the lower limit area TH_ShAreaL and the upper limit area TH_ShAreaH are used to make comparison with the largest region area HL_Area2 as in Expression (2).

$$TH\_ShAreaL < HL\_Area2 < TH\_ShAreaH \qquad \text{Expression (2)}$$

When Expression (2) is satisfied, the system controller 113 then determines the shining correction amount based on an average luminance value of the halation connected regions. The shining correction amount based on the luminance values of the halation regions can be obtained by using a known technology described in Japanese Patent No. 4803178 and the like, and the detailed description thereof is omitted here.

Further, in the case of this embodiment, for example, when the largest region area HL_Area2 is not smaller than the upper limit area TH_ShAreaH, the system controller 113 sets the shining correction amount to zero (0). Similarly, also when the total area HL_Area2 is not larger than the lower limit area TH_ShAreaL, the system controller 113 sets the shining correction amount to zero (0). The shining correction amount being zero (0) means, in other words, that the shining correction processing is not performed. Specific examples of the lower limit area TH_ShAreaL and the upper limit area TH_ShAreaH are described later in FIG. 7.

In the case of this embodiment, as described above, the lower limit area TH_DpAreaL and the upper limit threshold TH_DpAreaH are used as the threshold areas at the time of calculating the D-range expansion correction amount. Further, the lower limit area TH_ShAreaL and the upper limit area TH_ShAreaH are used as the threshold areas at the time of calculating the shining correction amount. In this embodiment, the respective threshold areas that are used at the time of calculating the D-range expansion correction amount and the shining correction amount have the relationship as in Expression (3).

TH_ShAreaL<TH_DpAreaL

TH_ShAreaH<TH_DpAreaH

TH_DpAreaL<TH_ShAreaH    Expression (3)

FIG. 7 is a diagram for describing the relationship of the respective threshold areas that are used at the time of calculating the D-range expansion correction amount and the shining correction amount. In FIG. 7, each of the threshold areas is illustrated as converted to an area ratio with respect to the entire image in order to facilitate an understanding of the magnitude of each of the threshold areas. As illustrated in FIG. 7, the range in which the shining correction processing is performed is a range of from the lower limit area TH_ShAreaL to the upper limit area TH_ShAreaH, and is set to, for example, a range of from 1% to 5% in terms of the area ratio with respect to the entire image. The range in which the D-range expansion correction processing is performed is a range of from the lower limit area TH_DpAreaL to the upper limit area TH_DpAreaH, and is set to, for example, a range of from 3% to 30% in terms of the area ratio with respect to the entire image. As thus described, the lower limit area TH_ShAreaL at the time of calculating the shining correction amount is set to a smaller value in terms of the area ratio than the lower limit area TH_DpAreaL. Meanwhile, the upper limit area TH_ShAreaH at the time of calculating the shining correction amount is set to a larger value in terms of the area ratio than the lower limit area TH_DpAreaL. Further, the upper limit area TH_ShAreaH at the time of calculating the shining correction amount is set to a smaller value in terms of the area ratio than the upper limit area TH_DpAreaH at the time of calculating the D-range expansion correction amount. From the above, only the shining correction processing is performed in the range of from 1% to 3% in terms of the area ratio with respect to the entire image, and only the D-range expansion correction processing is performed in the range of from 5% to 30% in terms of the same. Meanwhile, both the D-range expansion correction processing and the shining correction processing are performed in the range of from 3% to 5% in terms of the area ratio with respect to the entire image. In the range of from 0% to not more than 1% and the range of from not less than 30% to 100% in terms of the area ratio with respect to the entire image, the correction amount is zero (0) in both the D-range expansion correction processing and the shining correction processing, and hence any one of the correction processing is not performed.

The description is returned to the flowchart of FIG. 4. After Step S405, the system controller 113 advances the processing to Step S406.

When advancing the processing to Step S406, the system controller 113 controls the image processor 108 to perform the shining correction processing. In this case, as mentioned in the description of the second tone correction processing, the image processor 108 performs tone correction for selectively reducing a pixel signal value on a saturated region (halation region), namely the shining correction processing. After Step S406, the system controller 113 advances the processing to Step S209 of FIG. 2.

<Example of D-Range Expansion Correction Amount Determination Processing in Accordance with Shutter-Speed Photographing Condition>

Although the example of determining the D-range expansion correction amount in accordance with the ISO-sensitivity photographing condition has been described with reference to FIG. 6, the D-range expansion correction amount and the shining correction amount may be determined in accordance with a shutter-speed photographing condition, for example. Typically, as the shutter speed becomes lower, the object image becomes more liable to be blurred. When the object image is blurred, the accuracy in the result of the face recognition in Step S401 in the shining correction described with reference to FIG. 4 may deteriorate to cause erroneous detection of a position different from that of the face as the face region or cause failure in detection of a desired face, which can lead to deterioration in correction accuracy of the shining correction. On the other hand, in the D-range expansion correction, the processing is performed on the entire image while the processing is not performed on regions unlike in the case of the shining correction, and it is thus possible to perform desired correction even the object image is blurred. Hence, there may be employed a determination method of setting a larger correction amount for the D-range expansion correction while setting a smaller correction amount for the shining correction as the shutter speed of the photographing condition becomes lower. In the case of this example, the correction amount for the shining correction in accordance with the shutter-speed photographing condition is determined in Step S405 of FIG. 4, for example. In the case of using this method, when the shutter speed is low and blurring can occur in the object image, it is possible to prevent the occurrence of such erroneous correction as to perform the shining correction processing on a different region from the face.

<Example of D-Range Expansion Correction Amount Determination Processing in Accordance with Diaphragm Photographing Condition>

The D-range expansion correction amount may be determined in accordance with the diaphragm-value photographing condition. Typically, as the diaphragm value is set closer to the open side, the depth of field becomes smaller, and an object located in a position other than an in-focus position becomes more liable to be blurred. When the in-focus position is off the object, the accuracy in the result of the face recognition in Step S401 in the shining correction described with reference to FIG. 4 may deteriorate to cause erroneous detection of a position different from the face as the face region or cause failure in detection of a desired face, which can lead to deterioration in correction accuracy of the shining correction. On the other hand, in the D-range expansion correction, the region processing as in the case of the shining correction is not performed, and it is thus possible to perform desired correction even when the object image is blurred. Hence, there may be employed a determination method of setting a larger correction amount for the D-range expansion correction while setting a smaller correction amount for the shining correction as the diaphragm-value photographing condition is set closer to the open side. In the case of this example, the correction amount for the shining correction in accordance with the diaphragm-value photographing condition is determined in Step S405 of FIG. 4, for example. In the case of using this method, when an f-number of the diaphragm is small (a diaphragm value on the open side) to make the depth of field small and the object is liable to fall out of focus, it is possible to prevent the occurrence of such erroneous correction as to perform the shining correction processing on a different region from the face.

As described above, in the digital camera 100 of this embodiment, a correction amount for at least any one of the D-range expansion correction and the shining correction is determined in accordance with the photographing condition. For example, the D-range expansion correction amount can be determined as a correction amount in a range not exceeding an upper limit that is set in accordance with the ISO sensitivity. In the case of this embodiment, for example, as shown in FIG. 6, a setting is made to lower the D-range expansion correction amount in the case of a high ISO sensitivity with which an S/N ratio is significantly low, thereby enabling prevention of an increase in noise. Meanwhile, when the D-range expansion correction amount is low, the luminance of the finally photographed image is high. In this case, as described above, the average luminance of the halation connected region is high, which raises the correction amount for the shining correction, and it is thus possible to obtain an image in which the halation is prevented.

In the case of this embodiment, as described above, the D-range expansion correction amount and the shining correction amount are determined based on results of the photographed image recognition processing on the photographed image, and in particular, the shining correction processing is performed in a range in which the area of the halation connected region does not exceed a predetermined area. In this embodiment, as described above, a threshold range of the area with respect to the halation connected region for performing the shining correction processing is set rather small and the threshold range of the area at the time of performing the D-range expansion correction is set rather large, thereby producing the following effect. That is, when the area of the halation connected region is relatively small, the shining correction processing is preferentially performed to allow prevention of an increase in noise due to the D-range expansion correction. On the other hand, when the area of the halation connected region is relatively large, the shining correction processing is not performed and the D-range expansion correction processing is preferentially performed, to thereby allow achievement of natural tone correction in which a trace of unnatural processing is unnoticeable, the trace being made by performing the shining correction processing on a large region.

It is also possible to consider a method of determining the D-range expansion correction amount and the shining correction amount through use of a condition other than the examples described above. For example, in the shining correction, processing for determining connection of halation pixels and subtracting a signal value of each pixel is performed as described above, and hence the processing time becomes longer as the correction target region becomes larger. Hence, such a method is intended to be used as to handle only a specific region with high priority, for example, the face, as a processing target. According to this method, the processing time can be reduced. Meanwhile, the D-range expansion correction processing is processing for performing exposure control and uniform gamma processing in the entire image, and hence the magnitude of the corrected region has no influence on the processing time. This leads to the use of a method of setting a larger D-range expansion correction while setting a smaller shining correction amount as the halation that has occurred in regions other than the face becomes more. By setting the correction amount in accordance with the position of the region in which much halation has occurred, it is possible to obtain the effect of preventing an excessive decrease in S/N ratio due to the D-range expansion correction, while performing necessary tone correction.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-242163, filed Dec. 14, 2016, which is hereby incorporated by reference herein in its entirety.

What is claimed is:

1. An image pickup apparatus, which is configured to perform tone correction for preventing saturation of a pixel signal value of a photographed image, the image pickup apparatus comprising:
   at least one processor or circuit configured to function as following unit,
   a first correction unit configured to perform first tone correction that combines exposure control and gain control on the pixel signal value of the image, wherein the exposure control involves setting of exposure in photographing of the image to exposure lower than appropriate exposure, and the gain control involves a process of increasing luminance of a low luminance portion of the image acquired by the photographing;
   a second correction unit configured to perform second tone correction for reducing a pixel signal value in a region in which the pixel signal value of the image is higher than a predetermined value; and
   a determination unit configured to determine a first correction amount to be used for the first tone correction and a second correction amount to be used for the second tone correction in accordance with a photographing condition.

2. An image pickup apparatus according to claim 1, wherein the photographing condition includes at least any one of an ISO sensitivity, a shutter speed, and a diaphragm value.

3. An image pickup apparatus according to claim 1, wherein: the determination unit is configured to: determine a tentative exposure value based on an image acquired in a photographing standby state before final photographing of the image; tentatively determine the first correction amount with respect to the final photographing based on luminance of the image acquired in the photographing standby state with the tentative exposure value; and set, when the tentatively determined first correction amount exceeds an upper limit set in accordance with an ISO sensitivity that is the photographing condition, a correction amount lowered to the upper limit as a finally determined first correction amount; and the first correction unit is configured to perform the first tone correction based on the finally determined first correction amount.

4. An image pickup apparatus according to claim 1, wherein the determination unit is configured to determine the second correction amount to be a smaller correction amount as a shutter speed set as the photographing condition becomes lower.

5. An image pickup apparatus according to claim 4, wherein the determination unit is configured to determine the first correction amount to be a larger correction amount as the shutter speed set as the photographing condition becomes lower.

6. An image pickup apparatus according to claim 1, wherein the determination unit is configured to determine the second correction amount to be a smaller correction amount as a diaphragm value set as the photographing condition becomes smaller.

7. An image pickup apparatus according to claim 6, wherein the determination unit is configured to determine the first correction amount to be a larger correction amount as the diaphragm value set as the photographing condition becomes smaller.

8. An image pickup apparatus, which is configured to perform tone correction for preventing saturation of a pixel signal value of a photographed image, the image pickup apparatus comprising:
at least one processor or circuit configured to function as following unit,
a first correction unit configured to perform first tone correction that combines exposure control and gain control on the pixel signal value of the image, wherein the exposure control involves setting of exposure in photographing of the image to exposure lower than appropriate exposure, and the gain control involves a process of increasing luminance of a low luminance portion of the image acquired by the photographing;
a second correction unit configured to perform second tone correction for reducing a pixel signal value in a region in which the pixel signal value of the image is higher than a predetermined value;
an analysis unit configured to analyze a photographing scene; and
a determination unit configured to determine a first correction amount to be used for the first tone correction and a second correction amount to be used for the second tone correction based on a result of the analysis.

9. An image pickup apparatus according to claim 8, wherein the analysis performed by the analysis unit includes processing for obtaining any one of a position and an area of a region having a pixel signal value saturated in the photographing scene.

10. An image pickup apparatus according to claim 9, wherein: the determination unit is configured to: determine to perform the first tone correction when the area of the region having the pixel signal value saturated is larger than a previously set first area; and determine to perform the second tone correction when the area of the region having the pixel signal value saturated is larger than a previously set second area; and the first area is larger than the second area.

11. An image pickup apparatus according to claim 10, wherein: the determination unit is configured to determine to perform the first tone correction without performing the second tone correction when the area of the region having the pixel signal value saturated is larger than a third area; and the third area is larger than the second area.

12. An image pickup apparatus according to claim 10, wherein: the determination unit is configured to: determine to perform the first tone correction when the area of the region having the pixel signal value saturated falls within a range of from the previously set first area to a fourth area; and determine to perform the second tone correction when the area of the region having the pixel signal value saturated falls within a range of from the previously set second area to a third area; and the fourth area is larger than the third area, and the third area is larger than the first area.

13. An image pickup apparatus according to claim 9, wherein:
the determination unit is configured to:
determine to perform the first tone correction when the area of the region having the pixel signal value saturated is larger than a previously set first area.

14. An image pickup apparatus according to claim 10, wherein:
the determination unit is configured to:
determine to perform the second tone correction when the area of the region having the pixel signal value saturated is larger than a previously set second area.

15. A method of controlling an image pickup apparatus configured to perform tone correction for preventing saturation of a pixel signal value of a photographed image, the method comprising:
determining a first correction amount to be used for first tone correction and a second correction amount to be used for second tone correction in accordance with a photographing condition;
performing the first tone correction that combines exposure control and gain control on the pixel signal value of the image, through use of the first correction amount, wherein the exposure control involves setting of exposure in photographing of the image to exposure lower than appropriate exposure, and the gain control involves a process of increasing luminance of a low luminance portion of the image acquired by the photographing; and
performing the second tone correction for reducing a pixel signal value in a region in which the pixel signal value of the image is higher than a predetermined value, through use of the second correction amount.

16. A method of controlling an image pickup apparatus configured to perform tone correction for preventing saturation of a pixel signal value of a photographed image, the method comprising:
analyzing a photographing scene;

determining a first correction amount to be used for first tone correction and a second correction amount to be used for second tone correction based on a result of the analysis;

performing the first tone correction that combines exposure control and gain control on the pixel signal value of the image, through use of the first correction amount, wherein the exposure control involves setting of exposure in photographing of the image to exposure lower than appropriate exposure, and the gain control involves a process of increasing luminance of a low luminance portion of the image acquired by the photographing; and performing the second tone correction for reducing a pixel signal value in a region in which the pixel signal value of the image is higher than a predetermined value, through use of the second correction amount.

* * * * *